United States Patent [19]
Ramer et al.

[11] Patent Number: 5,877,849
[45] Date of Patent: Mar. 2, 1999

[54] OBJECT DETECTION SYSTEM

[75] Inventors: David P. Ramer, Dayton, Ohio; Jack C. Rains, Jr., Herndon, Va.

[73] Assignee: Advanced Optical Technologies, LLC, Chevy Chase, Md.

[21] Appl. No.: 854,796

[22] Filed: May 12, 1997

[51] Int. Cl.[6] .............................. G01C 3/00; G01C 21/02
[52] U.S. Cl. ...................... 356/3.01; 356/3.13; 250/206.1
[58] Field of Search ................................. 356/3.01, 3.03, 356/3.08, 3.06, 3.13, 141.1, 141.2; 396/120; 250/206.1

[56] References Cited

U.S. PATENT DOCUMENTS

| | | | |
|---|---|---|---|
| 2,969,018 | 1/1961 | Erst et al. . | |
| 3,532,892 | 10/1970 | Murphy | 356/141.2 |
| 4,410,270 | 10/1983 | Zuckerman | 356/152 |
| 4,443,706 | 4/1984 | DiMatteo et al. . | |
| 4,674,874 | 6/1987 | Halldorsson et al. . | |
| 4,711,998 | 12/1987 | Malek . | |
| 5,153,426 | 10/1992 | Konrad et al. . | |
| 5,165,064 | 11/1992 | Mattaboni | 356/152 |
| 5,270,795 | 12/1993 | Blais | 356/375 |
| 5,309,339 | 5/1994 | Webb . | |
| 5,393,970 | 2/1995 | Shau et al. . | |
| 5,510,893 | 4/1996 | Suzuki . | |
| 5,613,167 | 3/1997 | Suzuki | 396/106 |
| 5,705,804 | 1/1998 | Ramer et al. . | |
| 5,733,028 | 3/1998 | Ramer et al. . | |
| 5,773,819 | 6/1998 | Ramer et al. . | |

*Primary Examiner*—Mark Hellner
*Attorney, Agent, or Firm*—McDermott, Will & Emery

[57] ABSTRACT

The present invention provides for a detection system for detecting an object, comprising optical elements including a radiation source of an electromagnetic nature and at least one detector detecting radiation reflected off the object from the radiation source. The system is configured so that trigonometric relationships are established between all or selected of the optical elements and the object. Using the angle of radiation from the radiation source and the angle of reflection into the detector, the system determines the range or distance, and/or velocity of the object relative to the system. While the use of one detector is sufficient to provide an angle measurement for the system to determine the object range and/or velocity, an additional detector may be used to increase accuracy and flexibility. The detectors of the system may have be normal-looking, or side-looking detectors, either of which detects intensity variations. Each detector uses a mask and a baffle in accordance with the concept of constructive occlusion, which improves the response characteristics of the detector. The mask occupies a predetermined position within the detector to enable the detector to provide a tailored response profile. The baffle is configured within the detector to partition a diffusely-reflective cavity within the detector. An LED array or a scanning light assembly may be used with the system as the radiation source.

36 Claims, 12 Drawing Sheets

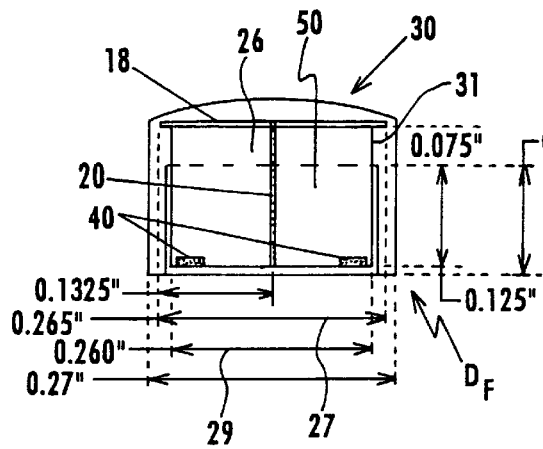
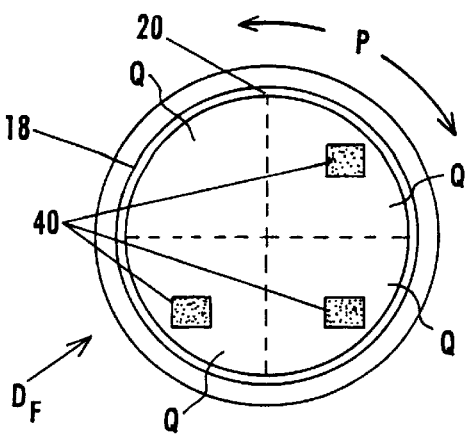
Figure 3A
Figure 3B
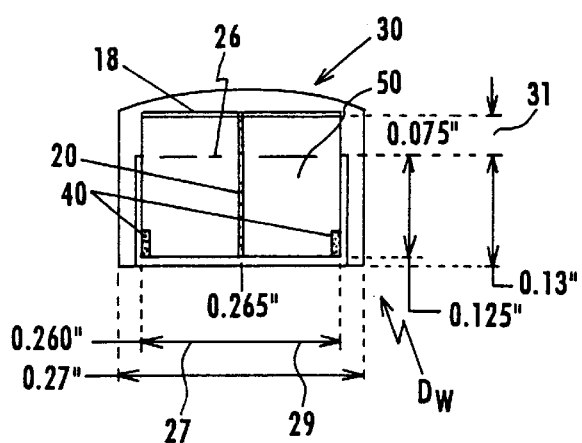
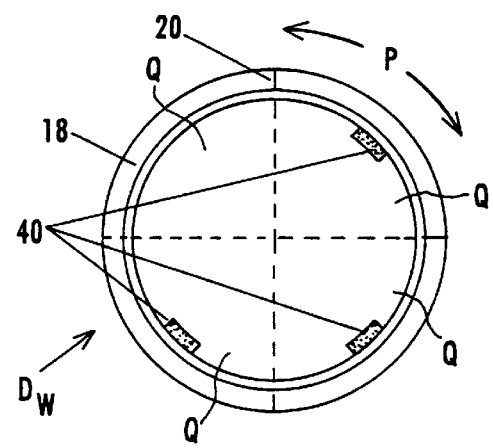
Figure 3C
Figure 3D
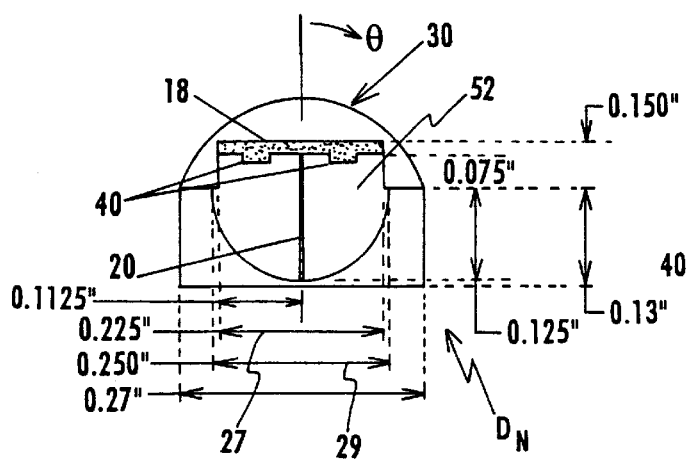
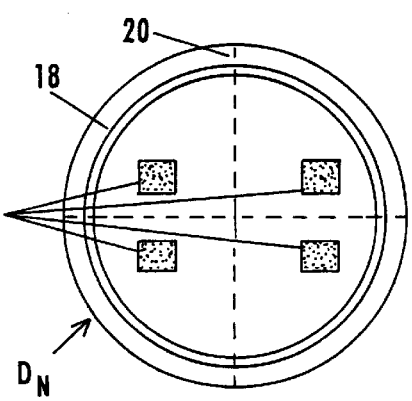
Figure 3E
Figure 3F

OBJECT DETECTION SYSTEM

BACKGROUND OF THE INVENTION

The present invention relates generally to systems that determine an object's range and/or velocity, in particular, a system with optical elements having distinct radiation and detection properties for determining an object's relative distance or range, and/or velocity to the system.

There are many uses for object detection systems. To improve building or vehicle security, object detection systems may be used to detect approaching thieves or vandals. To improve personal security, object detection systems may be used to detect the range of an assailant within which personal security devices may be deployed. In particular, aerosol repellents, such as the now widely-available "pepper sprays," or electronic debilitating devices, often prescribe an optimum range for effective use. Beyond the field of surveillance and security, object detecting systems may also improve levels of performance, productivity and/or safety in various industrial environments where collisions between objects and/or people are to be avoided. The risk of accidents or injury in the transport of heavy loads or even the parking of an automobile may be substantially reduced with the use of object detection systems.

Conventional object detection systems or devices, in particular, those using optics, use lateral effects diodes. These diodes are typically expensive and have relatively poor performance levels.

It should therefore be appreciated that there exists a definite need for a relatively simple and inexpensive object detection system, which can determine a distance or a range of an object with flexible operating parameters. It is also desired that the system be operative on the detected object within a minimum range, even substantially up to the point of contact between the object and the optical elements of the system, and that such optical elements of the system be relatively small in size, for example, on the order of an inch, or fractions thereof. It is further desired that the system be capable of detecting the velocity of a moving object and be relatively free from interference due to environmental impurities such as dirt or dust. The present invention addresses all of these desires and more.

SUMMARY OF THE INVENTION

The present invention resides generally in an optical detection system that detects the range or distance, and/or velocity of objects relative to the system.

The present invention provides for a system having a plurality of optical elements, including a radiation source and at least one detector. The radiation source may emit radiation that is electromagnetic in nature and if so, preferably near the infrared spectrum. The detector is responsive to the radiation that is emitted from the radiation source and reflected off the object.

The system is configured such that trigonometric relationships may be established between all or selected optical elements and the object whose distance or range to the system is to be determined. Applying the trigonometric relationships in conjunction with known physical parameters of the optical elements of the system, the system determines the range and/or velocity of the object.

In one embodiment, the radiation source and the detector are aligned along a base line whose perpendicular distance to the object is defined as the range of the object. The radiation source and the detector are separated by a known distance along the base line and the system is enabled to determine the range of the object. In this embodiment, the system is configured such that the radiation source, the detector and the object are situated at three remote locations representing vertices of a triangle. By determining various angles between the optical elements and the object, the range of the object is derived.

While the use of one detector and one radiation source is sufficient for determining the range and/or velocity of the object, another embodiment of the invention may also include an additional detector to improve flexibility and accuracy. Additional trigonometric relationships are established where the system is configured with the additional detector also lying on the base line, but opposing the first detector such that the radiation source is substantially situated between the two detectors. The system is configured such that the two detectors and the object are situated at three remote locations representing vertices of a triangle. The two detectors may but need not be at equal separation from the radiation source. With a known separation of the additional detector from the radiation source, and/or from the first detector, the system derives the range and/or velocity of the object with improved accuracy and flexibility.

Processing electronics are provided in the system to process signals from the detectors and/or the radiation source representing respectively the angle of reflection and/or the angle of radiation, to determine the range. With additional processing, the velocity at which the object may move relative to the detection system may also be determined.

Each detector of the system uses a mask and a baffle in accordance with the concept of constructive occlusion which improves the response characteristics of the detector. The mask occupies a predetermined position relative to the detector to enable the detector to provide a tailored response profile. The baffle is configured relative to the detector to partition a diffusely-reflective cavity within the detector, that receives the reflected radiation detected by the detector.

The detector may be configured as a normal-looking detector detecting the direction at which the radiation enters the detector in terms of elevation angles and/or azimuthal angles. Alternatively, the detector may be configured as a side-looking detector detecting the direction at which the radiation enters the detector in terms of azimuth angles. The processing electronics is configured according to the type of detector used, which may include the use of a look-up table. When used in pairs, the detectors of the pair may be both normal-looking, both side-looking, or a one of each type.

Other features and advantages of the present invention should become apparent from the following description of the preferred embodiments, taken in conjunction with the accompanying drawings, which illustrate, by way of example, the principles of the invention.

BRIEF DESCRIPTION OF THE DRAWINGS

FIGS. 3A–3D illustrate detailed embodiments of side-looking detectors;

FIGS. 3E and 3F illustrate detailed embodiments of normal-looking detectors;

DESCRIPTION OF THE PREFERRED EMBODIMENTS

As shown in the exemplary drawings, the present invention resides in an optical object detection system 10 that determines a range or distance, and/or velocity of an object, without requiring complicated electrical wiring, expensive photodetector arrays, video cameras, or image processing. More specifically, the system measures properties of electromagnetic radiation, such as radiation intensity and/or frequency, to provide at least an angle from which a range and/or a velocity of the object may be determined by the system through the principles of trigonometry.

Figure 1:
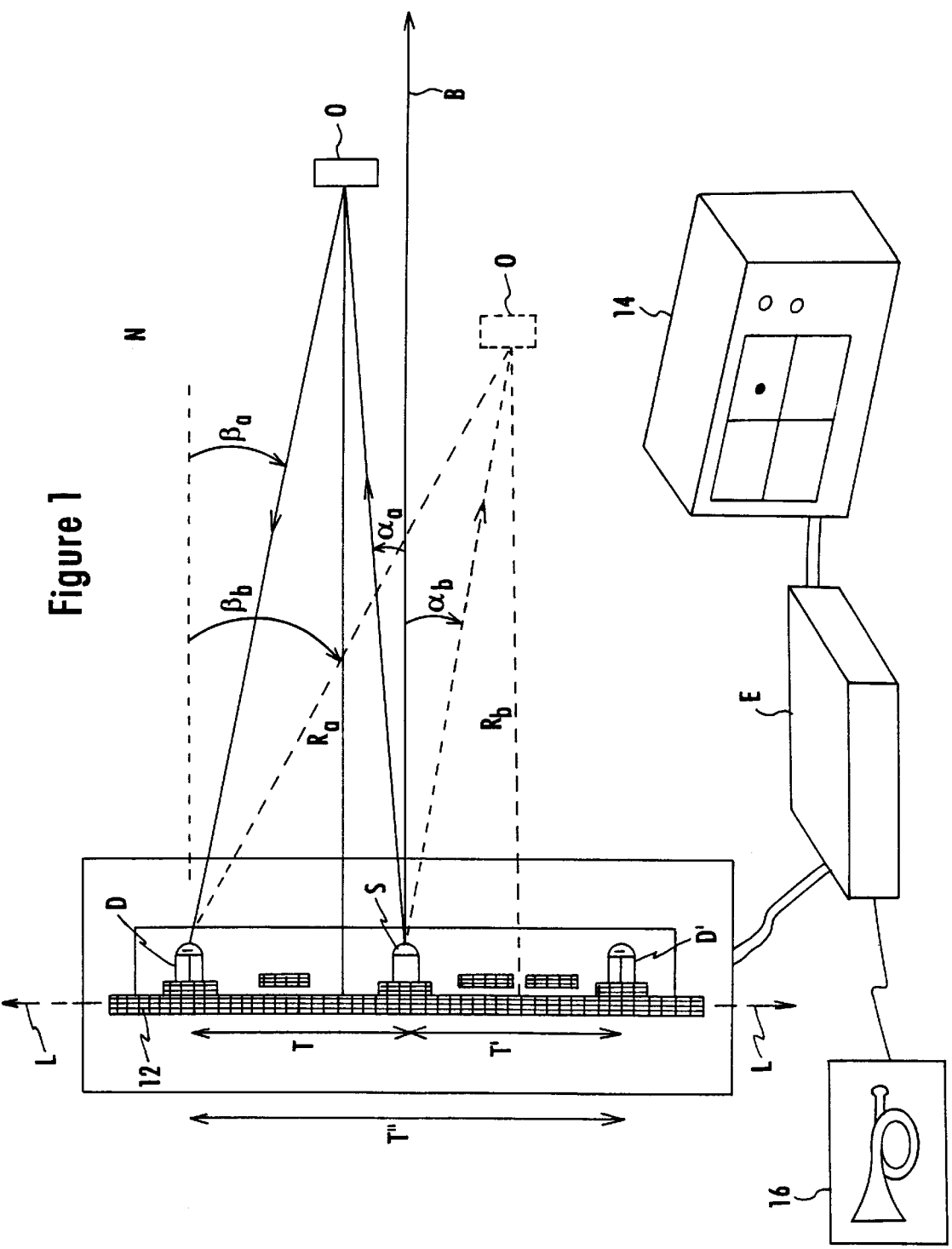
FIG. 1 is a perspective view of an object detection system in accordance with the present invention.

The detection system 10 in one embodiment as shown in FIG. 1, has a plurality of optical elements, including a radiation source S and a detector D that are affixed to a mounting bracket 12. The radiation source S emits radiation toward an object O which in turn reflects the radiation toward the detector D. The radiation emitted by the radiation source S may be electromagnetic in nature. In that regard, the radiation source S may be an infrared light emitting diode, although it is understood by one of ordinary skill in the art that the radiation source may also be a visible light source, though it is not limited to either.

The radiation source S and the detector D are situated along a base line L defined by the length of the mounting bracket 12 and are separated by a known distance T. The object O is located at a position as shown in a solid line, at a distance or range $R_a$ from the base line L and it defines an angle of radiation $\alpha_a$ with the radiation source S, and an angle of reflection $\beta_a$ with the detector D. The detector D determines the angle of reflection $\beta_a$ that is used by the system to determine the range R of the object O.

It can be seen that the system is configured such that the object O and the optical elements S and D are at three remote locations that may represent vertices of a triangle $\Delta OSD$. In this configuration, the system determines the angles $\alpha_a$ and/or $\beta_a$ in the manner described hereinbelow, to determine the range $R_a$ that is the direct or perpendicular distance substantially between the object O and base line L.

Where the object O is instead located at another position as shown in a broken line, the detector D determines a range $R_b$, with a determination of an angle of radiation $\alpha_b$ and an angle of reflection $\beta_b$ of the triangle $\Delta OSD$, though it is understood by one of ordinary skill in the art that the sign of the angle of radiation is to be properly defined within a predetermined coordinate system to reflect the object's position relative to the boresight B.

Accordingly, regardless of whether the object O is to one side or the other of the boresight B, the system 10 comprising the optical elements S and D determines the range of the object from the system. However, to improve accuracy and flexibility, the system 10 may include an additional detector D'. The system 10 is configured such that the detector D' is aligned with the detector D on the base line B. The system may be configured such that the detector D' opposes the detector D from across the radiation source S, or opposes the radiation source S from across the detector D. The system 10 is illustrated in FIG. 1 in the former configuration.

With a known separation T', which may but not need not be equal to the separation T, or a known total separation T", the additional detector D' provides an additional reflection angle in the manner described above for the detector D, that is used by the system for detecting the object O. Accordingly, the system is configured such that the two detectors D and D' and the object O are at three remote locations representing the vertices of a triangle $\Delta ODD'$.

The angles of reflection are determined by the system using intensity variations in the reflected radiation detected within each of the detectors D and D'. Signals representing the intensity variations within each detector are processed by a processor or an electronics unit E and representations of the range and/or velocity of the object O may be displayed on a display, such as an oscilloscope 14. An acoustic or sound-emitting device 16, such as a horn or a beeper, responsive to the electronics unit E may be included with the system 10, to provide audible signals representative of the range and/or velocity of the object O.

Figure 2A:
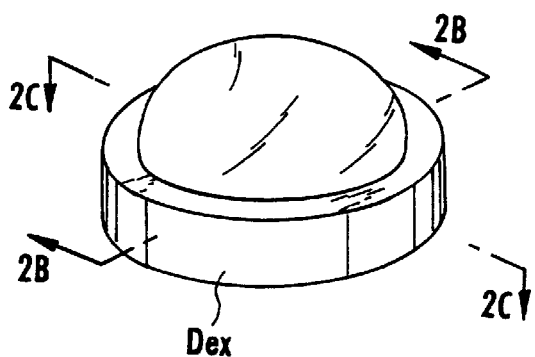
FIG. 2A is a perspective view of an exemplary embodiment of a detector in accordance with a feature of the present invention.
Figure 2B:
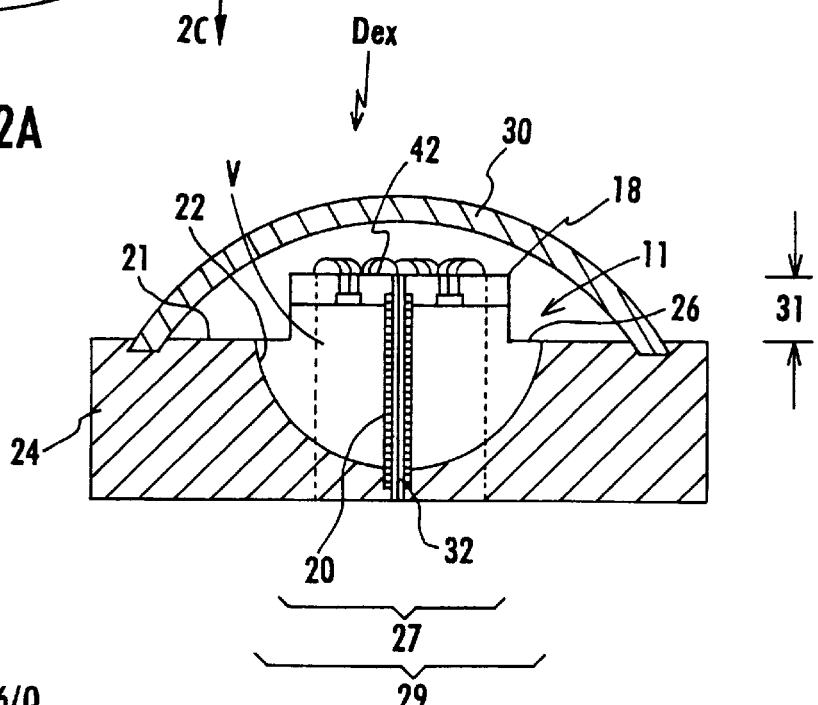
FIG. 2B is a cross section view of the detector of FIG. 2A, taken along line B—B.
Figure 2C:
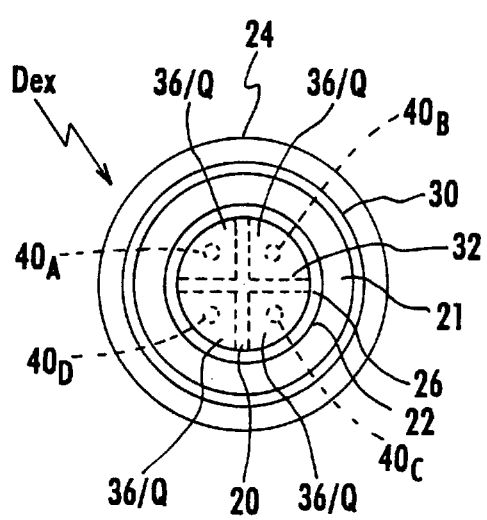
FIG. 2C is a cross section view of the detector of FIG. 2A, taken along line C—C.

Referring to FIGS. 2A, 2B and 2C, an exemplary detector Dex is shown, having a mask 18, a baffle 20 and a cavity 22. A base 24 is provided within which the cavity 22 is formed. The cavity 22 may be any shape, including cylindrical or hemispherical as illustrated and defines an aperture 26, serving as a detection surface, that is surrounded by a shoulder 21 at the top plane of the base 24. Where the aperture 26 is circular, the mask 18 is disk-shaped. In accordance with the concept of constructive occlusion, the mask 18 is of a predetermined size and shape, and is positioned a predetermined distance from the aperture 26. The mask 18 is thus within the hemispherical area which the cavity 52 faces. The mask 18, which need not be completely opaque so long as it provides a reduction in transmissivity, constructively occludes the aperture 24 to provide a predetermined acceptance ratio between the mask 18 and the aperture 26. Accordingly, the mask 18 may be configured such that the area of the cavity 22 exposed to the radiation is substantially constant and independent of the angle of radiation or incidence. It is noted that the term angle of radiation and angle of incidence are used interchangeably. In either instance, the angle addressed is the angle at which the reflected radiation enters the detector, relative to the detector.

In most instances, the mask 18 enables the detector Dex to have a substantially uniform response for most angles of elevation $\Theta$, i.e., from the normal down to approximately 10–20 degrees from the horizon relative to the detector. For angles of $\Theta$ near the horizon of the field of view of the detector $D_{ex}$, the baffle 20 enables the detector D to have substantially uniform response for those angles.

The mask 18, the baffle 20, and the base 24 with the cavity 22 may all be formed of a suitable diffusely reflective material such as Spectralon®. Spectralon® is a highly reflective polymeric block material manufactured and sold by Labsphere Inc. of North Sutton, N.H. Spectralon® is easily machined, durable, and provides a highly efficient Lambertian surface having a reflectivity of over 99% in the visible or near-infrared wavelengths. A Lambertian reflective surface reflects light with a substantially uniform intensity in all directions. Alternatively, the mask 18, the baffle 20, and the base 24 with the cavity 22 may be constructed of a block material, such as aluminum or plastic, and coated with diffuse reflective material, such as barium sulfate. The detector $D_{ex}$ includes a protective dome 30 allowing the transmission of radiation, to protect the various components of the detector $D_{ex}$.

Within the detector $D_{ex}$, the baffle 20 occupies a volume V substantially between the bottom of the cavity 22 and the underside of the mask 18. The baffle 20 is configured as intersecting members 32 that partition the volume V into sections 36 that may be symmetrical. In one embodiment, there are two intersecting planar members 32a and 32b that partition the volume V into four symmetric sections or quadrants Qa, Qb, Qc and Qd.

A quadrant detector is disclosed in U.S. patent application Ser. No. 08/589,104, filed Jan. 23, 1996, entitled QUADRANT LIGHT DETECTOR now U.S. Pat. No. 5,705,804. The disclosure thereof is hereby incorporated by reference in its entirety.

In accordance with a feature of the invention, radiation from the radiation source is reflected off the object and captured by one or both detectors. In particular, the four sections or quadrants Q capture the reflected radiation whereby the captured radiation intensity within a given quadrant depends on the elevation angle of incident of the incoming radiation, as well as the incoming radiation's overall intensity at any time. A significant function of the cavity 22 is to provide a diffusely reflective surface that averages the incoming radiation at the aperture 26 and the hemispheric shape is often preferred because of its azimuthal symmetry and ease of construction. As mentioned, other cavity shapes are acceptable. For purposes of describing the detector's operation, a working approximation is obtained by treating the cavity 22 as if it ere a diffusely reflective flat surface that averages the incident radiation in the plane of the aperture 26.

As also shown in FIGS. 2A–2C, localized sensors, such as photodetectors, e.g., photodiodes, 40a, 40b, 40c, and 40d are provided in each of the detectors D1 and D2 of FIG. 1. In particular, each of the photodetectors 40a–40d are associated with a distinct quadrant. Each photodiode generates an electrical signal based on the radiation intensity in the respective quadrant of the cavity. The photodiodes are commercially available and sold by United Detector Technologies (UDT) Sensors, Inc. of Hawthorne, Calif., as Model PIN-040A. Each photodiode has a responsive area of 0.8 square millimeters and a noise equivalent power (NEP) of $6 \times 10^{-15}$ Watts/(Hertz)$^{0.5}$. Such a photodiode with a relatively small responsive area has significant advantages including low noise characteristics and efficiency. In the latter regard, the efficiency of the detector increases as the detector/hemisphere diameter or area ratio decreases, resulting in a smaller detector often having a greater sensitivity than a large detector. Using these photodiodes, the detectors' efficiency nears their asymptotic state with an aperture having a diameter being approximately 0.5" or less.

It is understood by one of ordinary skill in the art that the photodetectors 40a–40d may be localized at the cavity 22, or at another location wherein the photodetectors 40a–40d remain responsive to incident radiation in the cavity 22 by means of light-conveying devices, such as fiber optics or optical waveguides, that efficiently transmit light into or away from the cavity 22 to such other location.

Referring still to FIGS. 2A–2C, the members 32 of the baffle 20 have a thickness of approximately 3.0 mm for improved opacity, which is also sufficient for small holes to be bore through the baffle 20 to accommodate small signal wires 42 that allow electrical connection to the photodetectors 40a–40d from the base 18. It is noted that the baffle 20 may be constructed out of Spectralon® doped with barium sulfate. Further, the reflectivity of the baffle 20 can be grated so that the baffle 20 can have an angle dependent reflectivity, if desired to compensate for any nonuniform effects.

The ratio between widths or diameters 27 and 29 of the mask 18 and the aperture 26, respectively, and distance 31 between the mask 18 and the aperture 26 are significant parameters in optimizing the detector's accuracy and response efficiency. A more accurate response is obtained as the mask/aperture diameter ratio approaches one. However, the detector's response efficiency or sensitivity decreases as the mask/aperture diameter ratio approaches one because the aperture's acceptance area necessarily decreases. It is understood by one of ordinary skill in the art that the dimensions and parameters of the detector of the system may be varied in accordance with the desired use or application for which the detector is intended.

As variations on the constructively-occluded detectors that may be used with the system, the detectors may be normal-looking, or side-looking. Normal-looking detectors have a hemispheric field of view in terms of elevation angles of $\Theta$ relative to the detectors, such as the detector $D_{ex}$ of FIGS. 2A–2D. In contrast, side-looking detectors have substantially an azimuthal or "ring" field of view in terms of azimuth angles $\rho$ relative to the detectors. Side-looking detectors may be either floor mounted or wall mounted. FIGS. 3A and 3B illustrate cross sectional and top views, respectively, of a "floor" mounted, side-looking detector $D_F$. The detector $D_F$ has a cylindrical cavity 50, with the photodetectors 40 mounted on the floor of the cavity 50. In this embodiment, the diameter 27 of the mask 18 is slightly greater than the diameter 29 of aperture 26. Incident radiation is captured by the detector $D_F$ between the mask 18 and the aperture 26 separated by the distance 31.

FIGS. 3C and 3D illustrate cross sectional and top views, respectively, of a wall mounted, side-looking detector $D_W$. The detector $D_W$ also has a cylindrical cavity 50, but the photodetectors 40 are mounted on the side of the cavity 50. In this embodiment, the diameter 27 of the mask 18 is nearly identical to the diameter 29 of the aperture 26.

Both the detectors $D_F$ and $D_W$ have a panoramic view of the surrounding horizon region. The panoramic view may be a complete "ring" covering 360 degrees in azimuth angles, or may be a partial "ring" covering a lesser predetermined range of azimuth angles, as explained below.

The side looking detectors $D_F$ and $D_W$ of FIGS. 3A–3D are typically mounted on a surface such that the detectors are responsive to azimuth angles $\rho$ of incident radiation. Even so, not all azimuth angles $\rho$ may be of interest or relevance. Accordingly, as best illustrated in FIGS. 3B and 3D, one of the quadrants Q may be vacant and only three photodetectors are used to detect, for example, 150 degrees in the azimuth direction. Of course, if desired, four photodetectors may be used for determining the direction of incoming radiation around 360 degrees of azimuth angle $\rho$. In that regard, it is understood by one of ordinary skill in the art that the configuration of the detectors $D_F$ and $D_W$ may be tailored or changed to meet the desired function and operation of the detector.

FIGS. 3E and 3F illustrate cross sectional and top views, respectively, of a normal-looking detector $D_N$. This detector is similar to the detector $D_{ex}$ of FIGS. 2A–2C in almost all respects, except its overall dimension is of smaller scale, as indicated by the dimensions shown in the illustration. Like the detectors of FIGS. 2A–2C, the detector $D_N$ of FIGS. 3E and 3F has a view of substantially the hemispherical area which the cavity 52 faces, in terms of elevation angles. The mask 18 is a predetermined distance from the aperture 26 and is thus within the hemispherical area which the cavity 52 faces. The diameter 27 of the mask 18 is slightly smaller than the diameter 29 of the aperture 26. Like the detector $D_{ex}$ of FIGS. 2A–2C, the detector $D_N$ has its photodetectors 40 mounted on the underside of the mask 18.

Figure 5:
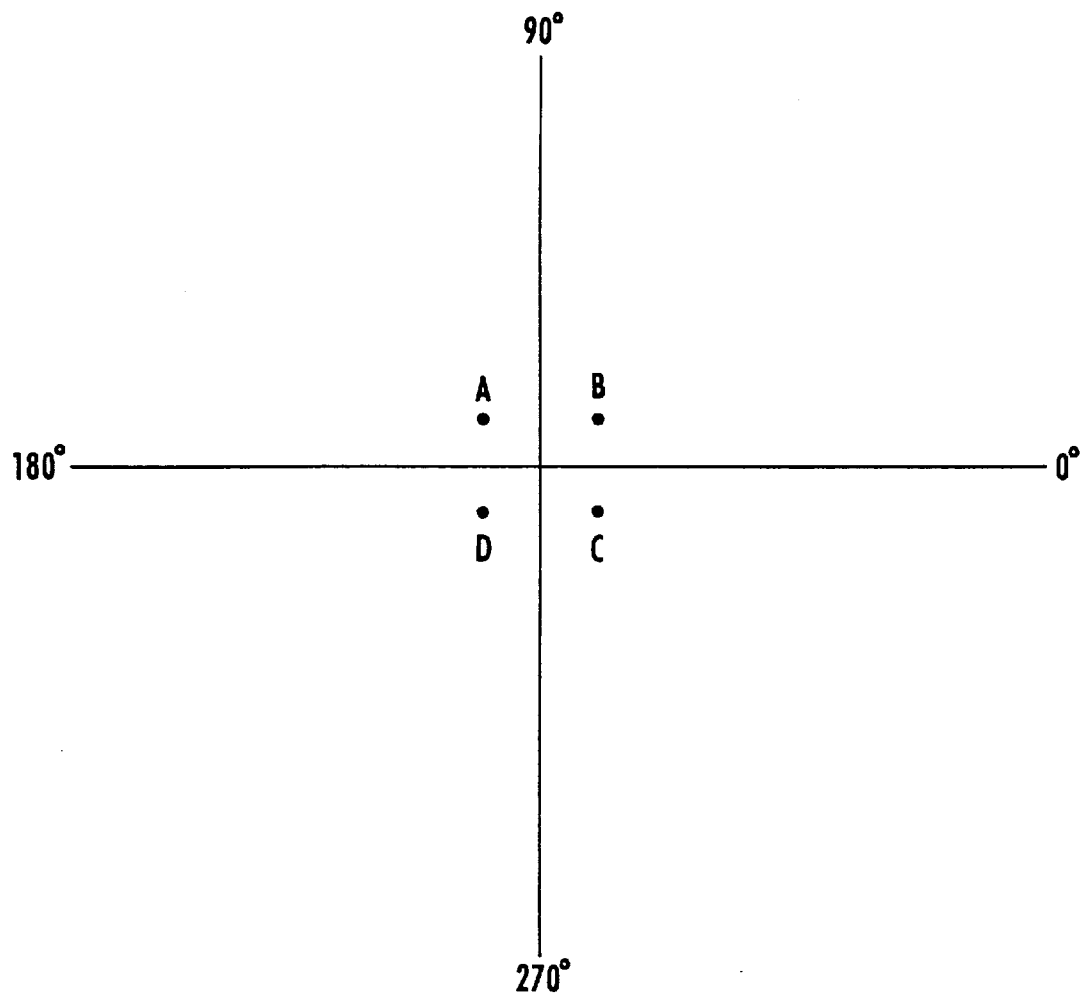
FIG. 5 illustrates a coordinate system with photodetector positions indicated, used to explain the detector output.

In accordance with a feature of the present invention, either the side-looking detectors $D_F$ and $D_W$ or the normal-looking detector $D_N$ may be used in the embodiment of the system shown in FIG. 1. Where the detectors D and D' in FIG. 1 are side-looking detectors, the angles of reflection β and β' defined within the system are detected as the azimuth angle ρ defined within the detectors. Limiting the discussion to the detector D of FIG. 1 only, it follows that:

$$\beta = \rho \qquad \text{Eqn. 1}$$

where in accordance with the detector configuration, $$\rho = \tan^{-1}(Y/X) \qquad \text{Eqn. 2}$$

and Y and X are output values of the detector electronics within the Cartesian coordinate system of FIG. 5, defined as follows:

$$X = [(B+C)-(A+D)]/(A+B+C+D) \qquad \text{Eqn. 3}$$

$$Y = [(A+B)-(C+D)]/(A+B+C+D) \qquad \text{Eqn. 4}$$

A, B, C and D represent the output signal levels of four photodetectors, respectively. If anyone of the photodetectors is not provided, e.g., where the desired azimuthal field of view is less than 360 degrees, that photodetector makes no contribution to Equation 3 or 4.

With the recognition that the boundaries of the quadrants are clearly delineated by the value of the tangent of the angle of radiation incident on one of those quadrants, Equation 2 with Equations 3 and 4 substituted therein becomes:

$$\rho = \tan^{-1} \frac{(A+B)-(C+D)}{(B+C)-(A+D)} \qquad \text{Eqn. 5}$$

Therefore, the angle of reflection β for the system when using the side-looking detectors of FIGS. 3A–3D is defined as:

$$\beta = \tan^{-1} \frac{(A+B)-(C+D)}{(B+C)-(A+D)} \qquad \text{Eqn. 6}$$

For the normal-looking detector of FIGS. 3E and 3F, the above equations are applicable; however, the angle of reflection β for the system is the elevation angle Θ of the detectors, that is provided by look-up table shown in Appendix A. In particular, the output of the photodetectors from the detector is still fed into Equations 3 and 4 for generating an X and a Y value for determining the azimuth angle ρ as set forth in Equation 2 above; however, a length L is also determined using the X and Y values as follows:

$$L = (X^2 + Y^2)^{1/2} \qquad \text{Eqn. 7}$$

The azimuth angle ρ and the length L are then used with the look-up table of Appendix A, to obtain an elevation angle Θ. For the normal-looking detector, the angle Θ is used by the system as the angle of reflection β of the system. Note that depending on how the elevation angle is defined in the look-up table, the angle Θ may require a conversion to an angle Θ' where Θ'=90−Θ. In the look-up table of Appendix A, the angle Θ of 90 degrees is taken to be the normal relative to the detector.

Figure 4:
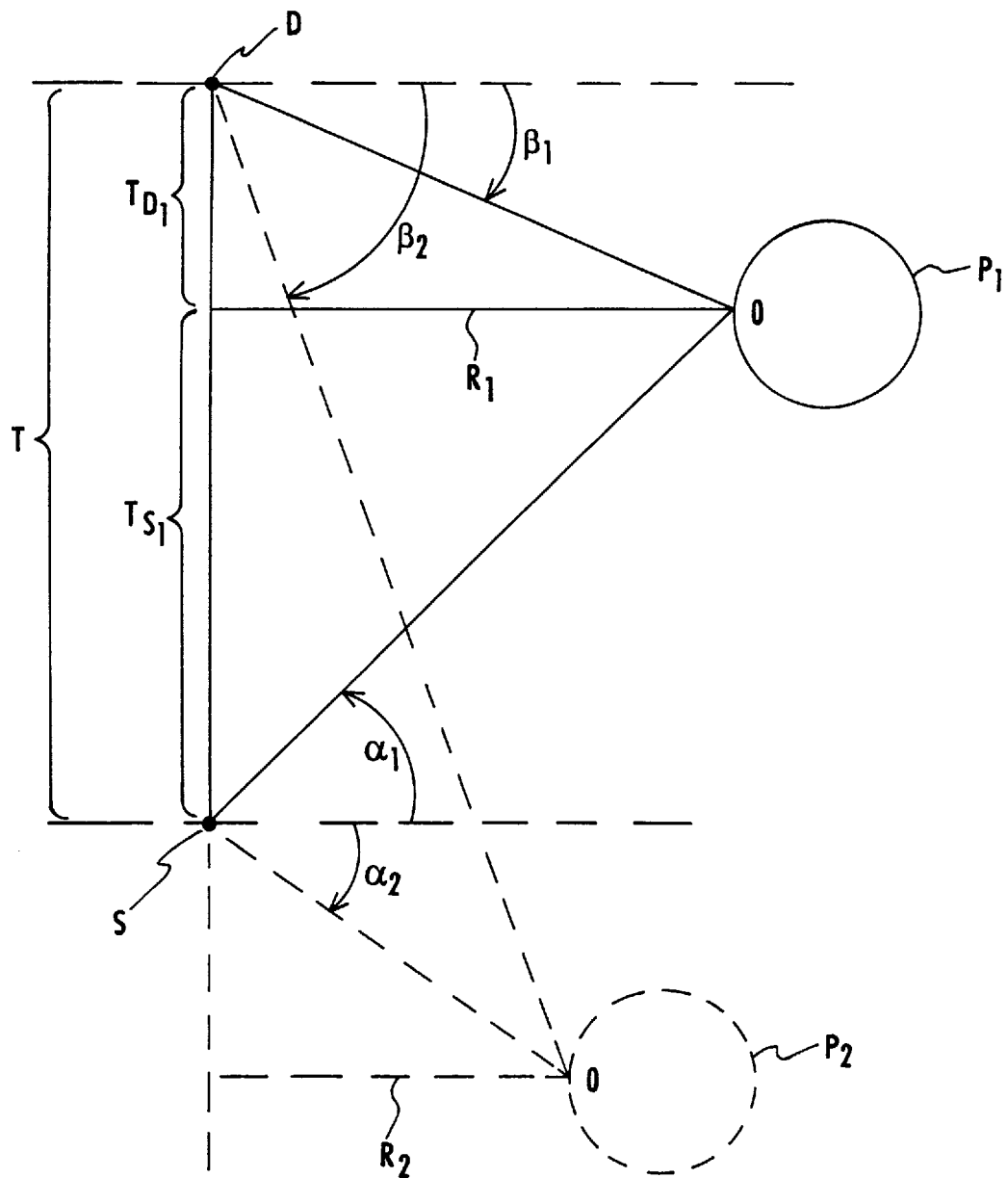
FIG. 4 is an illustration of the trigonometric relationships of an embodiment of the present system.

Once the angle of reflection β of the system has been determined, the system applies the trigonometric relationships defined within the system to determine the range R of the object. FIG. 4 illustrates an exemplary set of trigonometric relationships used by the system 10 with the range source S and detectors D and D' of FIG. 1, to determine the range R and R' of the object O. For simplification, the discussion (along with FIG. 4) is limited to the radiation source S and the detector D only.

As previously described, the radiation source S directs radiation at an angle $\alpha_1$ toward the object O which is located at position $P_1$. The object O reflects the radiation toward the detector D which receives the reflected radiation at an angle $\beta_1$. The angle $\alpha_1$ is known to the system as the angular position of the radiation source and the angle $\beta_1$ is determined by the system in accordance with Equation 2 for the side-looking detectors, or Equations 2 and 7 with the look-up table for the normal-looking detectors. With known trigonometric relationships, it follows from FIG. 4 that:

$$T_D = R_1 \tan \beta_1 \qquad \text{Eqn. 8}$$

$$T_S = R_1 \tan \alpha_1 \qquad \text{Eqn. 9}$$

$$T = T_D + T_S \qquad \text{Eqn. 10}$$

where the total distance T is known. Substituting Equations 8 and 9 into Equation 10, it follows that the known separation T between the detector D and radiation source S may be expressed as:

$$T = R_1 \tan \beta_1 + R_1 \tan \alpha_1 \qquad \text{Eqn. 11}$$

Solving for the range $R_1$, it follows that:

$$R_1 = \frac{T}{\tan\beta_1 + \tan\alpha_1} \qquad \text{Eqn. 12}$$

The range $R_1$ can therefore be derived since the separation T, the angle of radiation α, and the angle of reflection β are all known to the system.

If the object O is instead at position P2 (shown in broken lines in FIG. 4), it follows that a range $R_2$ may be expressed as follows:

$$R_2 = \frac{T}{\tan\beta_2 + \tan\alpha_2} \qquad \text{Eqn. 13}$$

where the angle of radiation $\alpha_2$, as previously mentioned, is defined with a sign opposite to that of the radiation angle $\alpha_1$.

The trigonometric relationships used above may be used for the detector D', with the recognition that the two sets of relationships are but mirror images of each other.

Figure 6:
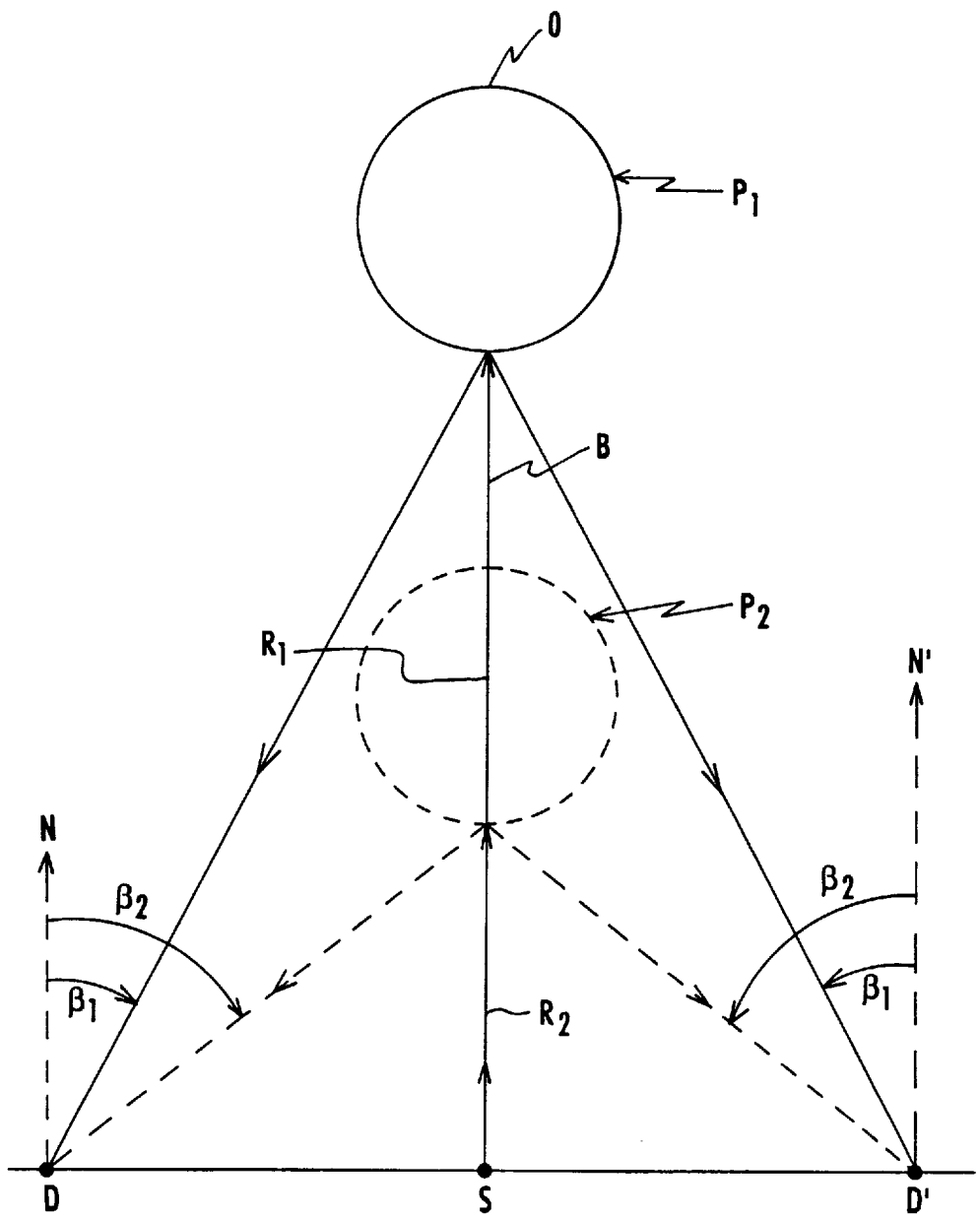
FIG. 6 is an illustration of the trigonometric relationships of another embodiment of the present system.

Referring to FIG. 6, the system may be configured such that the detectors D and D' are at substantially equal distance from the radiation source S along the base line L. Where the object O is on the boresight B of the radiation source S, it can be seen from the foregoing that both detectors D and D' detect substantially the same angle of reflection β. In certain instances, such as in vehicle airbag deployment, it may be useful to determine whether the object, that is the passenger, is centered relative to the system.

As the object O approaches the base line L from position $P_1$ to position $P_2$, the angle of reflection detected by both detectors D and D' increases from $\beta_1$ to $\beta_2$. Accordingly, the range determined by the system decreases from $R_1$ to $R_2$. For vehicle airbag application, it may be dangerous to deploy an airbag if the passenger is too close to the system. Accordingly, it may be desired that the airbag be enabled for deployment only if the detectors D and D detect a minimum angle of reflection from the passenger.

Figure 7:
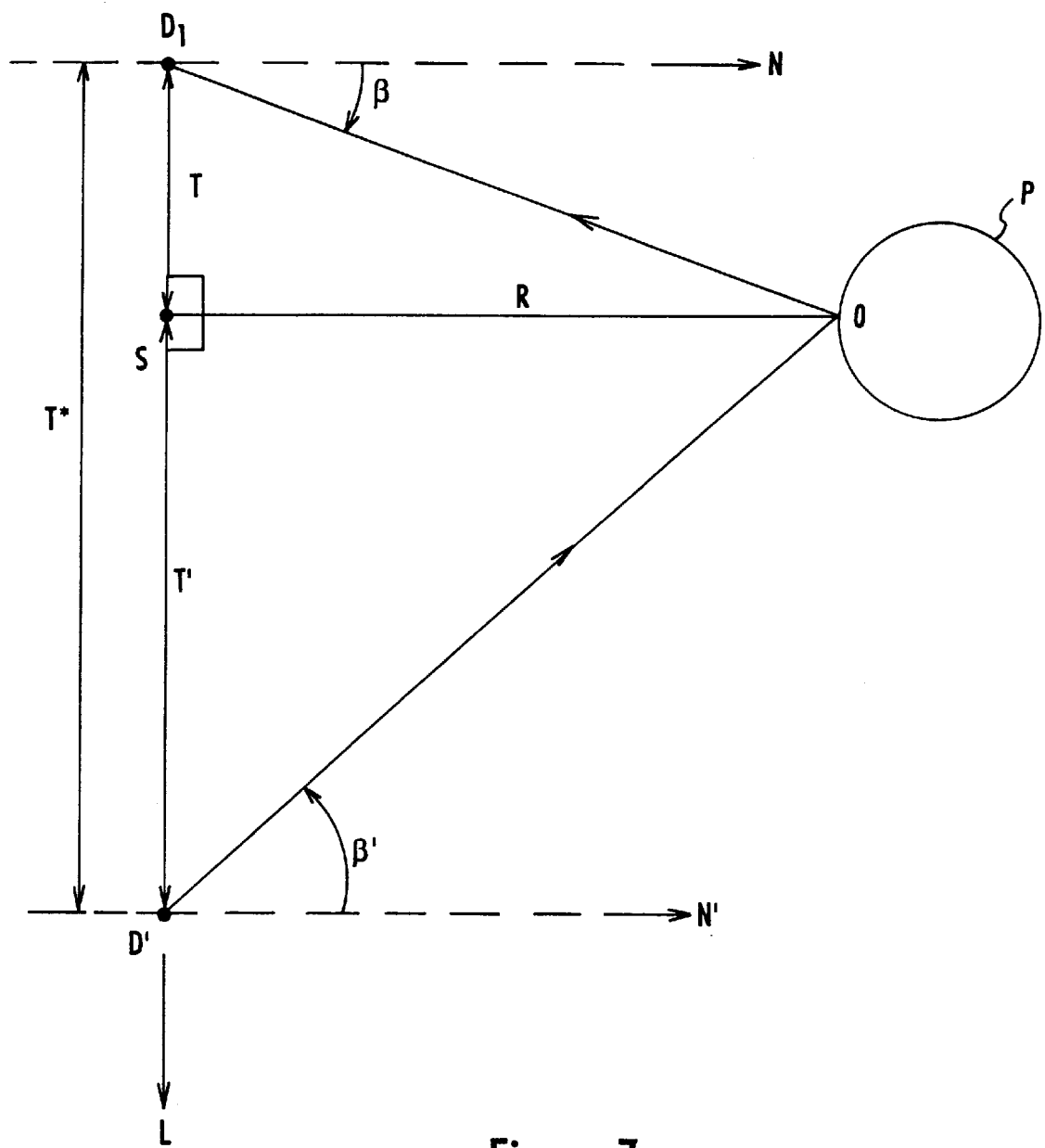
FIG. 7 is an illustration of the trigonometric relationships of yet another embodiment of the present system.

Referring to FIG. 7, where the system is configured such that the detectors D and D' are at unequal distances from the radiation source S along the base line L, the range R may be determined as follows, where the total separation T* between the detectors D and D' is known:

$$T = R \tan \beta \qquad \text{Eqn. 14}$$

$$T' = R \tan \beta' \qquad \text{Eqn. 15}$$

$$T^* = T + T' \qquad \text{Eqn. 16}$$

Substituting Equations 14 and 15 into Equation 16, it follows that:

$$T^* = R(\tan \beta + \tan \beta') \qquad \text{Eqn. 17}$$

Accordingly, the range R may be expressed as follows:

$$R = \frac{T^*}{(\tan \beta + \tan \beta')} \qquad \text{Eqn. 18}$$

If the detectors D and D' are the normal-looking detectors $D_N$ of FIGS. 3E and 3F, the detectors are oriented such that the cavities 52 open toward or face the object O; that is, they face a direction parallel with the boresight B. As mentioned, the angles $\beta$ and $\beta'$ of Equation 18 are the respective elevation angles derived from look-up table of Appendix A for each detector, using Equations 2 and 7. Alternatively, if the detectors are the side-looking detectors of either FIGS. 3A and 3B or 3C and 3D, the detectors are oriented such that the cavities 50 of the detectors face a direction 90 degrees from the boresight. As mentioned, the angles $\beta$ and $\beta'$ in Equation 16 are the respective azimuth angles as shown in Equation 2.

The system 10 has been described so far as detecting the range and/or the velocity of an object positioned within the plane defined by the page of the drawings. Where the object O is outside of that plane, i.e., above or below the page, the system 10 employing the normal-looking detectors $D_{ex}$ may be configured to determine the range and/or velocity of the object, by recognizing the trigonometric relationships that extend beyond the plane and applying both the azimuth angle and the elevation angle detected by the detectors $D_{ex}$ to those relationships, in manners known to those of ordinary skill in the art.

Figure 11A:
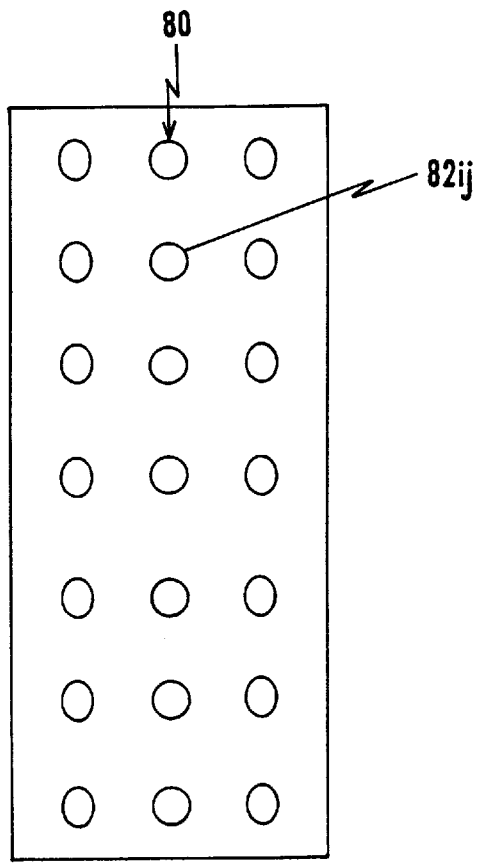
FIGS. 11A–11C illustrate a tope, side and end views, respectively, of an LED source array.
Figure 11B:
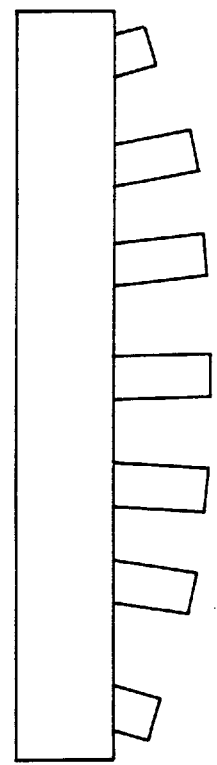
Figure 11C:
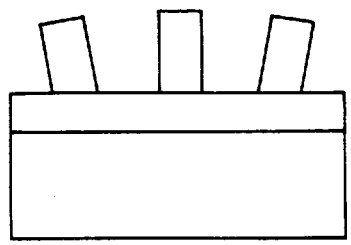
Figure 12:
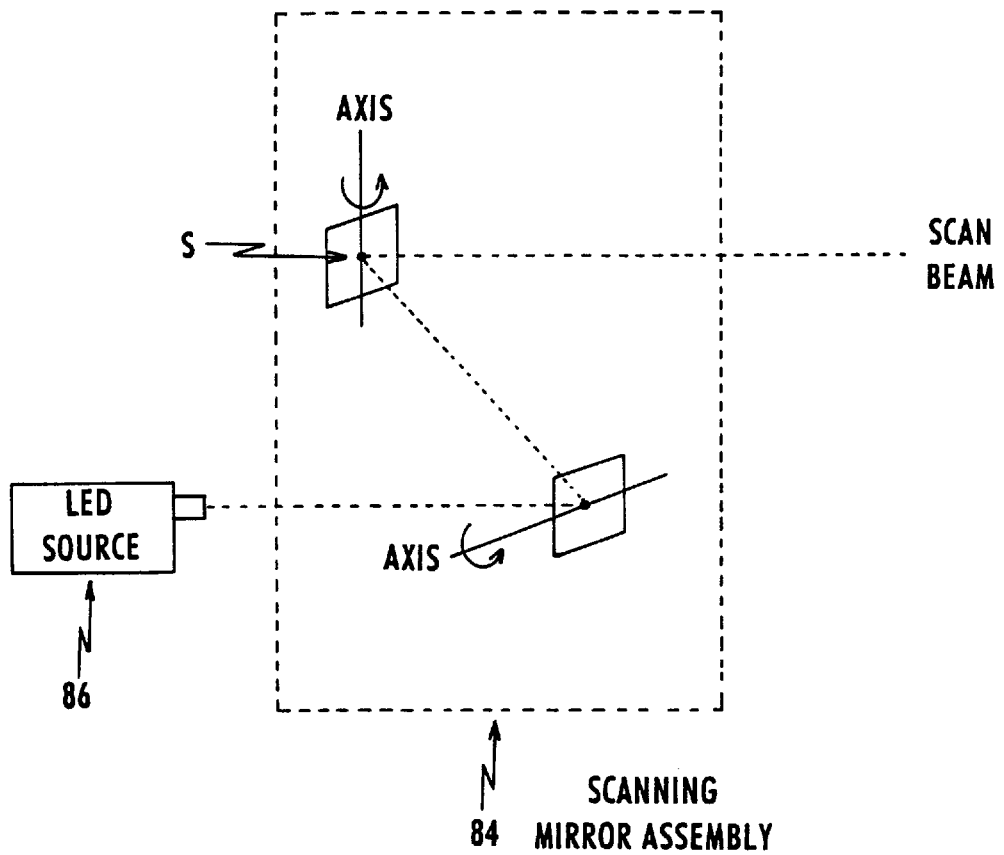
FIG. 12 illustrates a scanning radiation source.

With respect to the radiation source S of the system, the radiation source S may be an LED array 80, as illustrated in FIGS. 11A–11C, where a particular direction of radiation is provided by selective activation of a particular LED 82$_{ij}$ and/or physical orientation of the LED array 80. Alternatively, the system may use a mirror scanning assembly 84 in conjunction with an LED source 86, as illustrated in FIG. 12.

Figure 8:
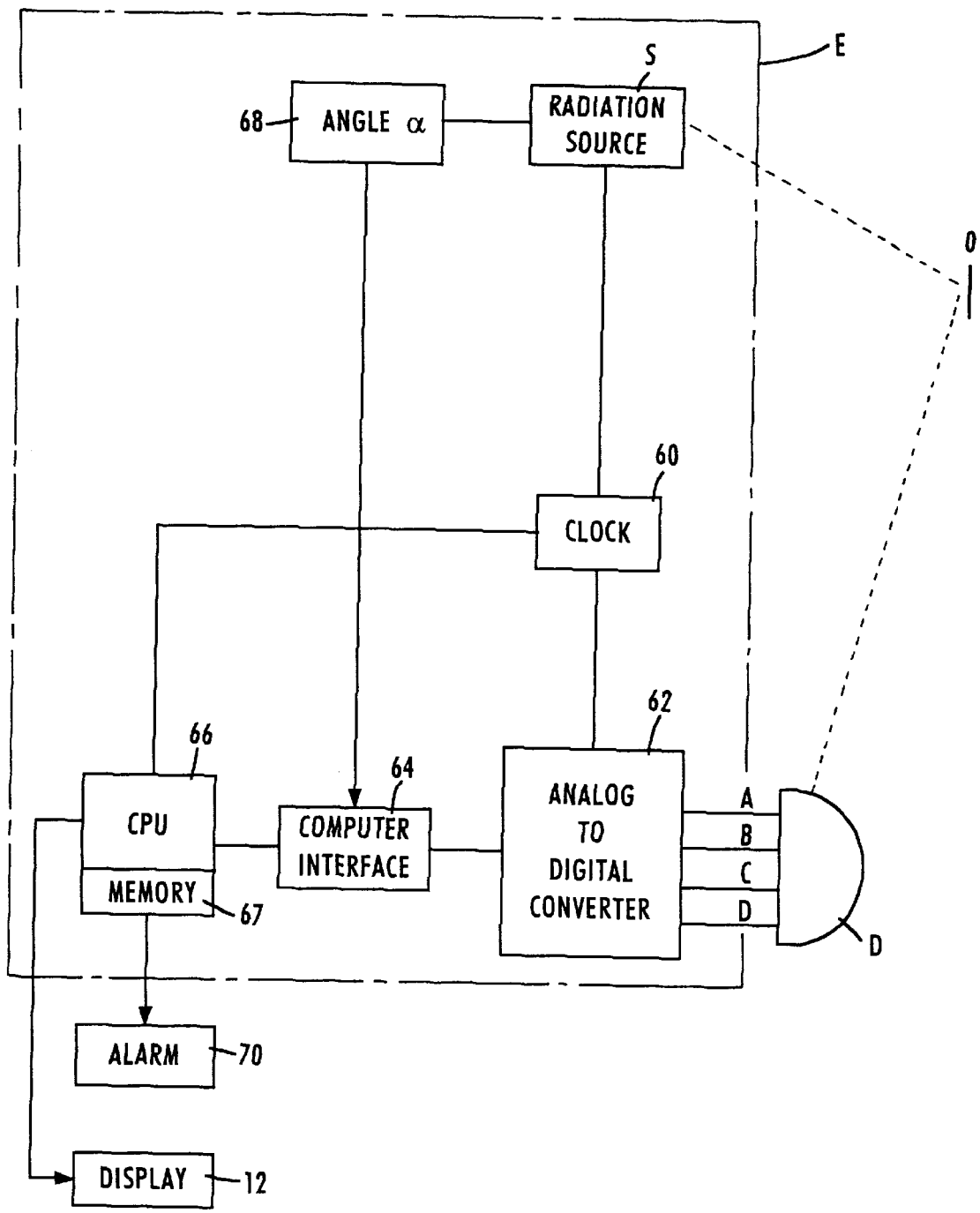
FIG. 8 illustrate electronics for driving a radiation source and for processing resulting information.

FIG. 8 illustrates exemplary electronics for the unit E (FIG. 1) for processing the output values of the detector D. The radiation source S may be driven by a clock 60 to emit radiation pulses. The clock 60 also drives the analog to digital converter 62 which receives the analog outputs from the detector D detecting the reflected radiation off the object O, converts them to digital form and transfers the digital values through computer interface 64 to CPU 66 with memory 67. The angular position of the radiation source S may be controlled by a angular control 68 which provides the angle $\alpha$ through the computer interface 64 to the CPU 66. The CPU 66 processing the results to determine the angle of incoming radiation and thus the range of the objection, may in turn drive an alarm 70 and/or the display 12 to indicate the range. Where the CPU 66 also provides a velocity of the object O, the clock 60 may provide timing sequences to the CPU 66, and the alarm 70 and/or the display 12 may also indicate such velocity.

Figure 9:
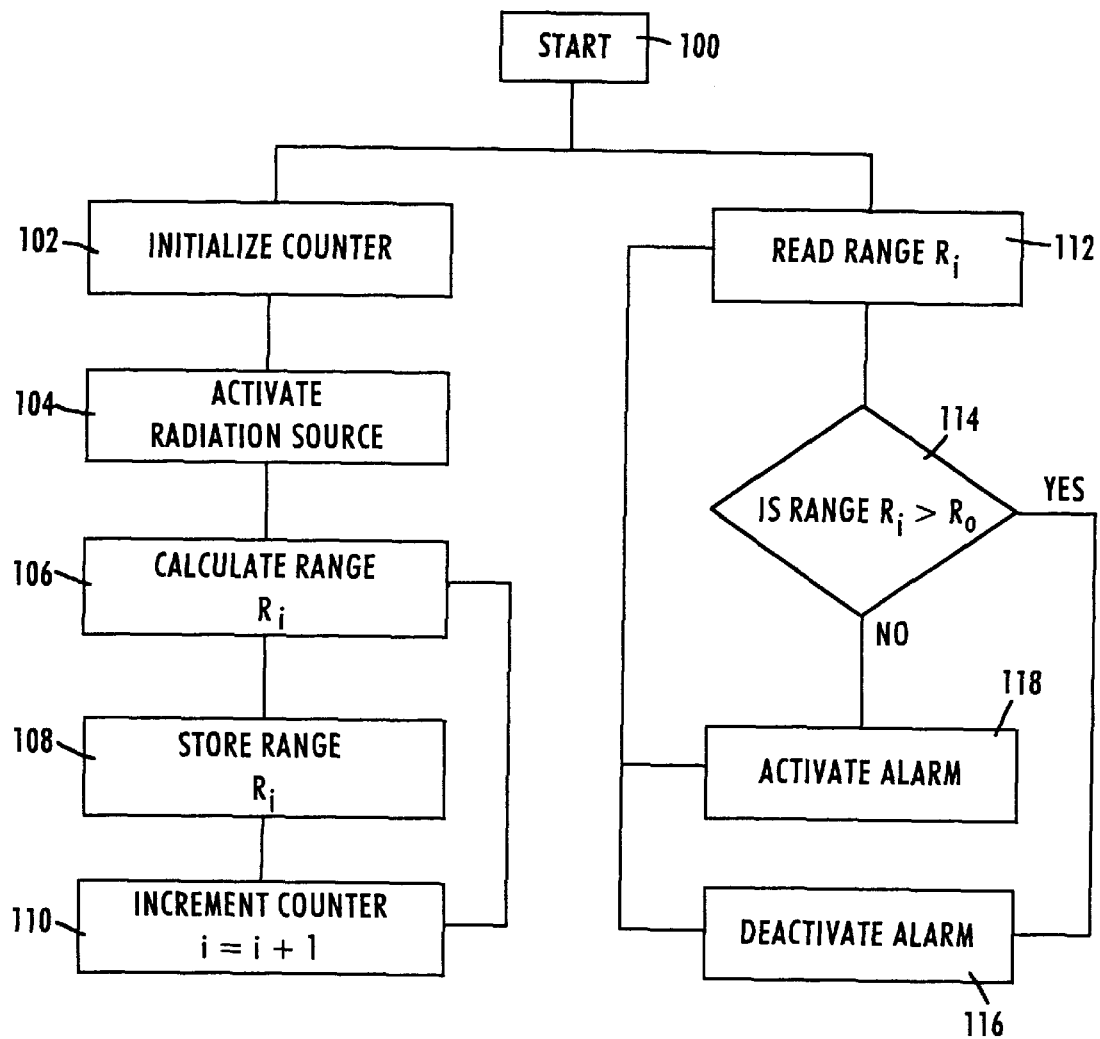
FIG. 9 is a flow chart of an exemplary program for detecting range of an object and activating an alarm.

FIG. 9 is a flow chart of an exemplary program activating an audio signal when the object O is within a predetermined range. For example, this program may be used for avoiding collisions between a vehicle and a wall. The program consists of two tasks, running substantially simultaneously, in parallel. The process begins (100), and in the first task, the counter is initialized (102). The clock, then in its first state, activates the radiation source (104) and then resulting range $R_i$ is detected (106) and stored in memory (108). The counter is incremented (110). This task continues to detect the range $R_i$ so long as the program is operating. Proceeding concurrently with this task is a second task which begins by reading the stored range $R_i$ (112) and comparing it with a predetermined range $R_O$ (114). If the range $R_i$ is greater than the set range value of $R_O$, the alarm will not be activated (116); otherwise, the alarm will be activated (118). So long as the program is in operation, the values of $R_i$ is compared with $R_O$.

Figure 10:
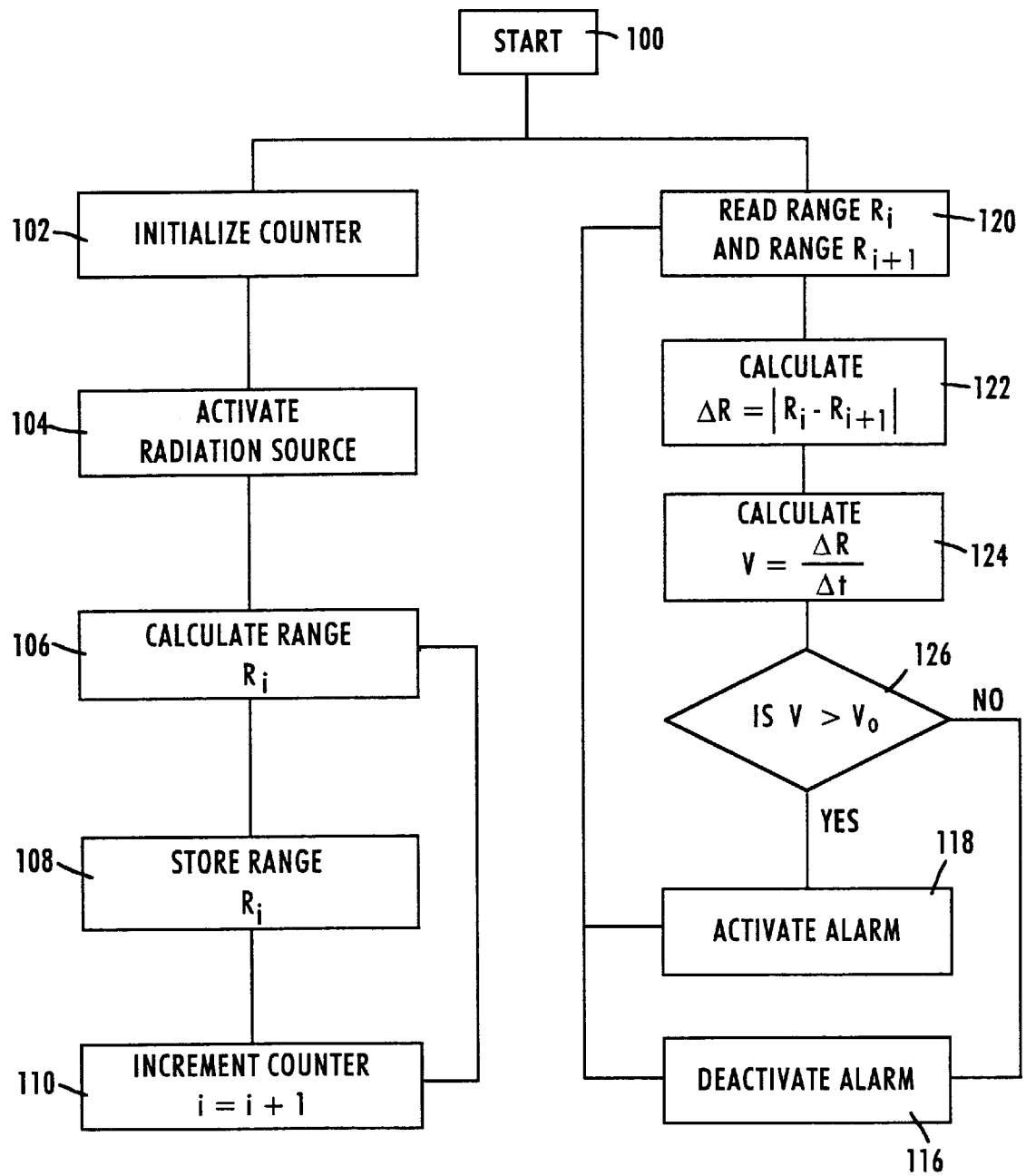
FIG. 10 is a flow chart of an exemplary program for detecting velocity of an object and activating an alarm.

FIG. 10 is a flow chart of a modified program that includes the determination of a velocity value, for example, to indicate whether the vehicle is approaching the wall within a safe speed. The program is similar to that of FIG. 9 with like reference numerals indicating like steps, except that in the second task, both the range $R_i$ and the range $R_{i+1}$ are read (120) and a change in range $\Delta R$ is calculated therefrom (122). The change in range $\Delta R$ is then used to calculate a velocity V by dividing the change in range $\Delta R$ by the change in time $\Delta t$ (124), which is provided by the clock that drives the radiation pulses. The velocity V is compared with a set velocity value of $V_O$ (126), and if the velocity V is greater a set velocity $V_O$, the alarm is activated (118); otherwise, the alarm is deactivated (116). It is understood by one of ordinary skill in the art that the program can be varied to provide range, velocity or even acceleration values, and to activate different warning or indication signals and/or displays.

Figure 2D:
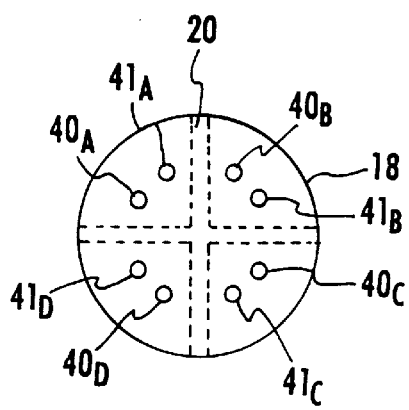
FIG. 2D is a partial cross section view of another exemplary embodiment of a detector in accordance with a feature of the present invention.

The system can also be configured to detect the range of multiple objects. For example, if a second object $O_2$ in addition to the object O is being detected by the system 10 and the second object $O_2$ has a radiation reflection characteristic distinguishable from that of the object O, photodetectors 41$_A$, 41$_B$, 41$_C$ and 41$_D$ spectrally responsive to the radiation reflection characteristic of the object $O_2$ may be arranged within the detector D as illustrated in FIG. 2D.

It can be seen that the present invention provides a relatively simple and cost effective system that can detect the range of an object, without a large number of optical elements or complex processing electronics. Although the foregoing discloses the presently preferred embodiments of the present invention, it is understood that the those skilled in the art may make various changes to the preferred embodiments shown and described without departing from the scope of the invention. Accordingly, the invention is defined only by the following claims.

We claim:

1. A detection system for detecting an object, comprising:
a plurality of optical elements, including:
a radiation source for emitting radiation toward said object;
at least one detector for detecting reflected radiation, including:
a detection surface;
a mask spaced from said surface;
a baffle positioned between said surface and said mask for defining radiation receiving sections within the detector;
a plurality of photodetectors wherein each photodetector is configured for response to said reflected radiation incident on a distinct radiation receiving section, each photodetector generating a signal representative of said incident reflected radiation; and
an electronic circuit processing said signal for detecting said object.

2. A detection system as defined in claim 1, wherein said system is configured such that said optical elements and said object form vertices of a triangle.

3. A detection system as defined in claim 1, wherein said system is configured such that said radiation source, said detector and said object form vertices of a triangle.

4. A detection system as defined in claim 1, wherein said optical elements further comprise an additional detector.

5. A detection system as defined in claim 4, wherein said system is configured such that said detector, said additional detector and said object form vertices of a triangle.

6. A detection system as defined in claim 5, wherein said radiation source is positioned between said detector and said additional detector.

7. A detection system as defined in claim 1, wherein said signal is representative of an intensity of said reflected radiation incident on said distinct radiation receiving section.

8. A detection system as defined in claim 1, wherein said radiation source emits infra-red electromagnetic radiation.

9. A detection system as defined in claim 1, wherein said detector is a normal-looking detector.

10. A detection system as defined in claim 1, wherein said detector is a side-looking detector.

11. A detection system as defined in claim 1, wherein said electronic circuit processes said signal for generating range data for said object.

12. A detection system as defined in claim 1, wherein said electronic circuit processes said signal for generating velocity data for said object.

13. A detection system as defined in claim 1, further comprising an acoustic device responsive to said electronic circuit for generating an audio signal.

14. A detection system as defined in claim 1, wherein said radiation source generates a radiation angle signal representative of a radiation angle, said radiation angle signal being processed by said electronic circuit.

15. A detection system as defined in claim 1, wherein said detector generates a reflection angle signal representative of a reflection angle, said reflection angle signal being processed by said electronic circuit.

16. A detection system as defined in claim 1, wherein said mask and said baffle have diffusely reflective surfaces.

17. A detection system as defined in claim 1, wherein said detection surface is defined by an aperture of a diffusely reflective cavity configured in said base.

18. A detection system as defined in claim 1, wherein said radiation source comprises an LED array.

19. A detection system as defined in claim 1, wherein said radiation source comprises a radiation scanning assembly.

20. A detection system as defined in claim 1, wherein each of said optical elements are separated from each other by a predetermined distance.

21. A detection system as defined in claim 4, wherein said detector and said additional detector are separated from each other by a predetermined distance.

22. A detection system as defined in claim 1, further comprising a display responsive to said electronic circuit for displaying an image representative of a range of said object.

23. A system for detecting an object within a predetermined field of view, comprising:
a radiator, for emitting radiation into the predetermined field of view;
a detector for detecting radiation reflected from within the predetermined field of view, the detector comprising:
(a) a base having a surface formed of a reflective material that defines a reflective region facing toward the predetermined field of view,
(b) a mask spaced a predetermined distance from the reflective region, said mask comprising a reflective surface facing substantially toward the reflective region of the base,
(c) a cavity having a diffusely reflective surface, the cavity being formed in one of the reflective region of the base and the reflective surface of the mask, and
(d) a sensor, responsive to incident radiation, that generates a response signal based on the intensity of radiation that it receives and that is coupled to the cavity so as to intercept radiation from within the cavity,
(e) wherein the mask is located between the base and the predetermined field of view such that the mask constructively occludes radiation incident to the detector from within the field of view with respect to the cavity so as to tailor response of light detector to the radiation reflected from within the predetermined field of view in a predetermined manner; and
an electronic circuit for processing the signal from the sensor, to detect said object.

24. A system as in claim 23, wherein the reflective region of the base is substantially diffusely reflective.

25. A system as in claim 23, wherein the reflective surface of the mask is substantially diffusely reflective.

26. A system as in claim 23, further comprising a baffle located between the base reflective region and the reflective surface of the mask and forming a plurality of optical sections with respect to light incident to the cavity, wherein the sensor comprises a plurality of radiant energy sensors each radiant energy sensor being coupled to one of the optical sections.

27. A system as in claim 23, wherein the field of view extends normal to the mask and base.

28. A system as in claim 23, wherein the mask, base and cavity are arranged to form a side-looking detector.

29. A system for detecting an object within a predetermined field of view, comprising:
a radiator, for emitting radiation into the predetermined field of view;
a detector for detecting radiation reflected from within the predetermined field of view, the detector comprising:
(a) a base configured with a detection aperture that receives light from substantially any direction within the predetermined field of view,
(b) a mask positioned within the predetermined field of view and spaced from said detection aperture so as to occlude a portion of the detection aperture with respect to the predetermined field of view, (c) a baffle positioned in said aperture between said mask and said base, said baffle dividing said aperture into regions, and (d) a plurality of detectors, each arranged to generate a signal representative of radiation incident through a respective region of the aperture; and an electronic circuit for processing the signals from the detectors, to detect said object.

30. A system as in claim 29, wherein the detection aperture defines a reflective region on the base.

31. A system as in claim 30, wherein the reflective region on the base is substantially diffusely reflective.

32. A system as in claim 30, wherein the aperture comprises an opening of a cavity formed in the base, the cavity having a reflective surface.

33. A system as in claim 29, wherein the mask comprises a reflective surface facing the detection aperture.

34. A system as in claim 33, wherein the reflective surface is substantially diffusely reflective.

35. A system for detecting an object within a predetermined field of view, comprising:

a radiator, for emitting radiation into the predetermined field of view;

a detector for detecting radiation reflected from within the predetermined field of view, the detector comprising:

(a) a base having a first reflective surface, (b) mask having a second reflective surface oriented to redirect at least some radiation toward the first reflective surface, wherein at least one of the reflective surfaces is substantially diffusely reflective, (c) a cavity formed in one of the reflective surfaces and arranged with respect to the mask such that the mask occludes a substantial portion of an opening of the cavity with respect to radiation reflected from within the predetermined field of view, and (d) at least one radiant energy sensor coupled to the cavity to sense radiant energy incident within the cavity; and an electronic circuit for processing a signal from the at least one radiant energy sensor, to detect said object.

36. A system as in claim 35, further comprising a baffle located between the mask and the base to divide radiation passing between the first and second reflective surfaces into a plurality of portions, wherein the at least one radiant energy sensor comprises a plurality of sensors each of which is receptive of one of the portions of the divided radiation.

* * * * *